Sept. 2, 1958     S. R. BILLINGSLEY     2,850,302
HOSE COUPLING WITH RIBBED SOCKET
Filed Sept. 16, 1953     2 Sheets-Sheet 1
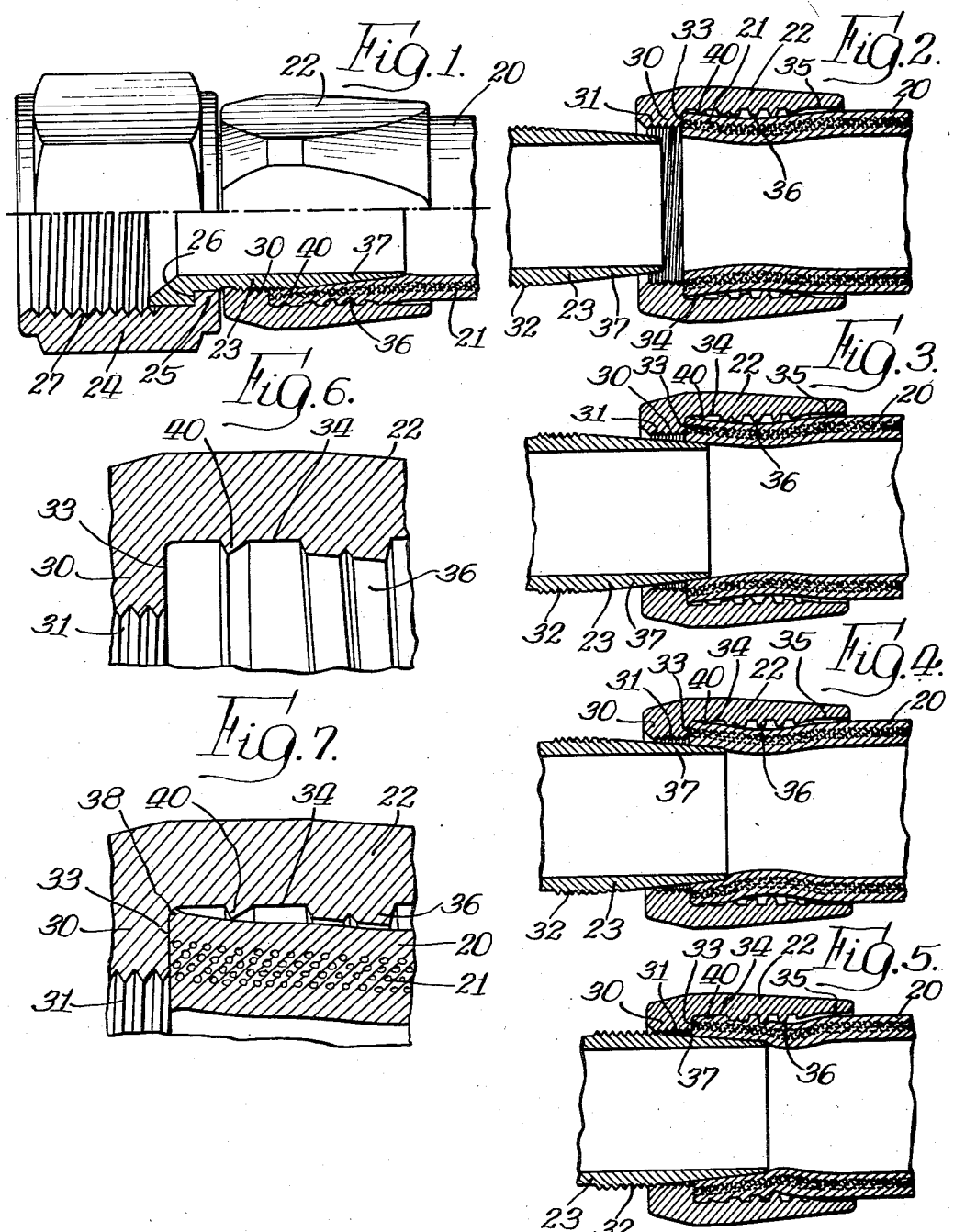
INVENTOR.
Samuel R. Billingsley,
BY
Davis Lindsey Hibbert & Noyes
Atty's.

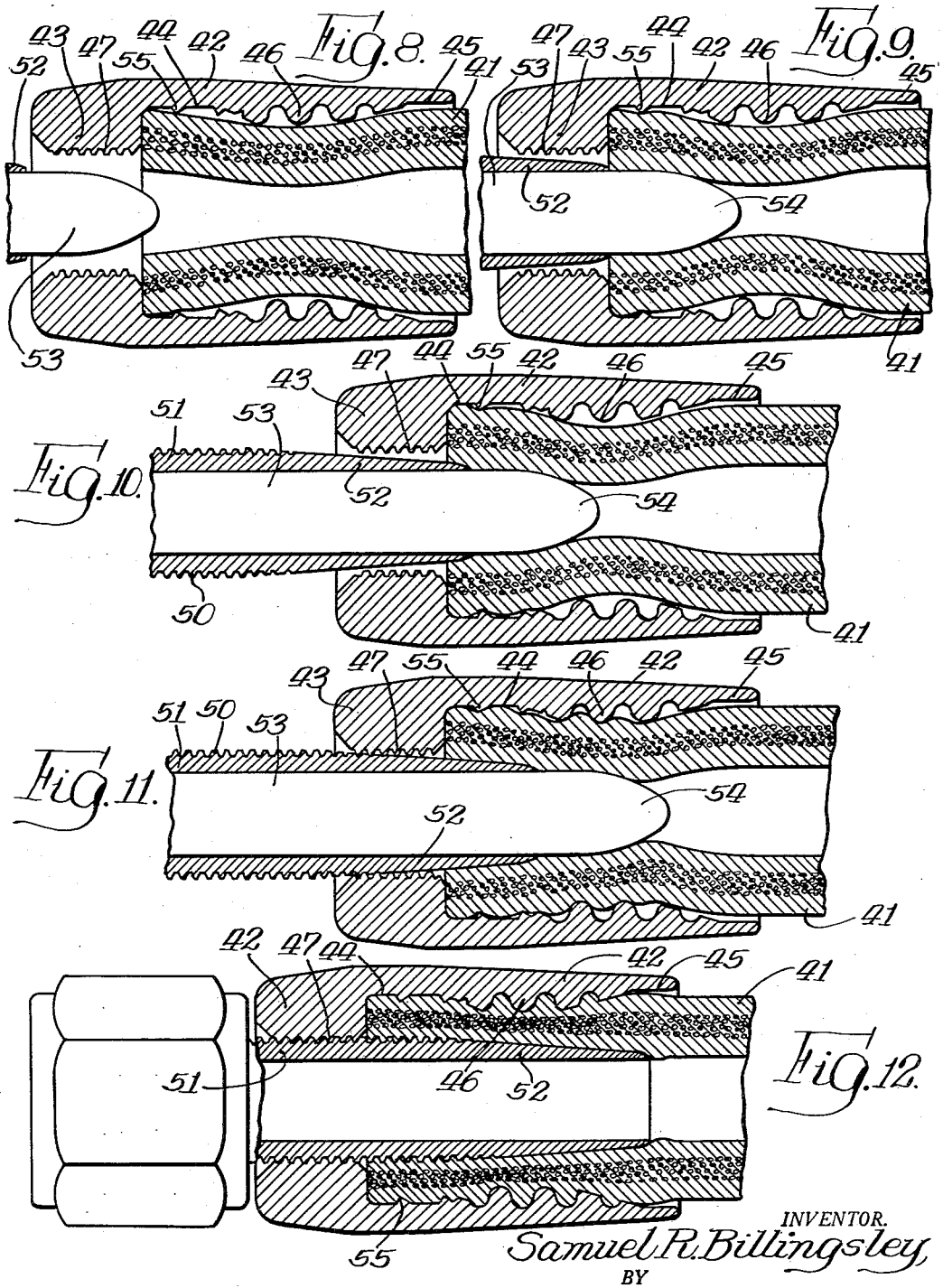

United States Patent Office 2,850,302
Patented Sept. 2, 1958

2,850,302

HOSE COUPLING WITH RIBBED SOCKET

Samuel R. Billingsley, Fort Worth, Tex., assignor to Stratoflex, Inc., Fort Worth, Tex., a corporation of Texas Application September 16, 1953, Serial No. 380,560

2 Claims. (Cl. 285—247)

The invention relates to hose fittings and more particularly to hose fittings for use on high pressure hose.

The general object of the invention is to provide a novel fitting of the foregoing character, which effectively grips the end of the hose without danger of leakage and without damaging the hose in such a way that it would be weakened.

Another object is to provide a novel fitting which holds the hose in proper relation to the parts of the fitting while the parts are being assembled on the hose, to avoid improperly assembled fittings.

More specifically, it is an object to provide a novel hose fitting comprising a socket member and a nipple member, the socket member being provided with internal means for gripping and holding the hose against endwise movement relative thereto while the nipple member is being moved into assembled relation with the socket member and hose.

A further object is to provide a novel method of assembling a hose fitting of the foregoing character on a hose.

Other objects and advantages will become apparent from the following description taken in connection with the accompanying drawings, in which:

Fig. 1 is an elevational view, partially in section, of a hose fitting embodying the features of the invention and applied to the end portion of a piece of hose;

Figs. 2 to 5, inclusive, are longitudinal sectional views showing the steps of assembling the fitting on the hose;

Fig. 6 is an enlarged fragmentary longitudinal sectional view of one of the socket members of the fitting;

Fig. 7 is a view similar to Fig. 6 but showing the position of the hose when first inserted in the socket member;

Figs. 8 to 11, inclusive, are longitudinal sectional views showing the steps of assembling another form of fitting on a hose; and Fig. 12 is a longitudinal sectional view of the fitting shown in Figs. 8 to 11, with the fitting completely assembled on the hose.

A fitting embodying the invention is of the type which is adapted to be used with so-called high pressure hose and is of such character that it is capable of withstanding high pressures under severe operating conditions. Hose with fittings of this character is frequently used in modern aircraft, as well as many other types of installations, for carrying various types of liquids. The hose with which the present fitting is adapted to be used is of the type which has a thick rubber wall or which may have one or more layers of wire braid, as well as fabric, embedded in the rubber.

For uses of the character mentioned above, it is absolutely essential that the fitting be properly assembled with the hose to avoid any chance of leakage under the high pressure involved and to clamp or hold the hose in such a manner that the hose is not unduly weakened by the pressure exerted upon it by the fitting. Furthermore, the end portion of the hose which carries the fitting must be held so that there is no substantial restriction to flow of fluid through the hose.

A fitting embodying the features of the invention can be properly applied to the end of the hose without requiring any great skill on the part of the person making the assembly, with assurance that the parts will all bear the proper relationship to each other and to the end portion of the hose. With many of the fittings that have been heretofore provided for this purpose, it has been found that improper assembly occurs in many instances without it being apparent to the person making the assembly. This arises generally because of the fact that the end portion of the hose is enclosed in a socket member which conceals such end portion, and the person making the assembly cannot readily determine, after the assembly is made, whether the hose has the proper relationship internally to the parts of the fitting. Usually, the defect resulting from improper assembly is discovered only after the hose line is assembled with other apparatus and is subjected to the pressure of the liquid carried thereby. The danger in this regard is apparent if the hose line is adapted to carry fuel or other inflammable liquids. Of course, even in the case of non-inflammable liquids, failure of the fitting because of improper assembly will result in improper functioning of the apparatus to which it is attached. In at least one serious airplane accident which occurred in recent years, it was found on investigation after that accident that the hose fittings had been improperly assembled as above described.

It is therefore apparent that the end portion of the hose must be accurately positioned within the fitting and held while the parts of the fitting are being assembled. Fittings of this type usually comprise a socket member and a nipple member having a telescoping relation with each other and with the hose. The difficulty ordinarily arises because of the fact that the nipple member, which is forced into the end of the hose, tends to force the hose out of the socket member as the nipple member is being inserted. The present invention provides a fitting in which the end portion of the hose is clamped and gripped by being expanded into tight engagement with the socket member before the nipple has been inserted into the hose far enough to cause any tendency to force the hose out of the socket member.

To describe this in more detail, the construction of a fitting embodying the invention is such that the nipple is inserted into the hose a substantial distance before the nipple engages the socket member, and such insertion of the nipple to this extent effects expansion of the hose within the socket so that the latter grips the hose firmly and prevents the hose from being forced out of the socket member as the nipple is being inserted farther and as the nipple engages the socket member. Thus, the further movement of the nipple into the hose will be prevented from moving the hose endwise relative to the socket member and proper assembly thereby results.

In the embodiment of the invention shown in Figs. 1 to 7, the hose is indicated at 20 and is of the type provided with a woven or braided wire reinforcement 21. The fitting comprises a socket member 22 and a nipple member 23. The fitting herein disclosed is of the female type and hence the nipple is provided with a collar 24 having an inwardly projecting flange 25 held between a shoulder 26 on the end of the nipple and the adjacent end of the socket member 22. The collar 24 is thus rotatably mounted on the nipple 23 and is provided with internal threads 27 for attachment to an adjoining part. The nipple 23 of course may be provided with an end male portion instead of the collar 24.

The socket member 22 is provided with symmetrically arranged flat faces on its exterior, in a hexagonal arrangement in the present instance so that it may be gripped by a wrench or the like. The collar 24 of course is also provided with an hexagonal exterior. The socket member 22 at one end is provided with an inwardly extending flange 30 having a central aperture internally threaded at 31 to coact with a threaded portion 32 on the nipple. The remainder of the socket member 22 provides a cavity to receive the end portion of the hose 20 and the flange 30 provides a shoulder 33 against which the end surface of the hose 20 is adapted to abut. The interior hose receiving portion of the socket at both of its ends has a diameter which is just slightly larger than the normal outside diameter of the hose. Thus, at its inner end, the cavity within the socket member has a portion 34 of such diameter at its inner end and a similar portion 35 at the outer end of the socket member. Between the portions 34 and 35, the socket member is provided with internal hose gripping means comprising in the present instance threads 36. The threads 36 taper from a minimum height at both ends to a maximum height between the ends as is apparent in the drawing. The threads 36 are preferably of opposite hand from the threads 32 and, since it is preferred to make the threads 32 right-hand, the threads 36 are therefore made left-hand. The hose, when it is cut to length, has a slight flare 38 (see Fig. 7) on its end due to the fact that the tension of the braided wire is released at the cut end, and the flared portion 38 expands into the portion 34 of the socket.

In the assembled relation of the parts, a portion of the hose is adapted to be expanded into tight engagement with the threads 36 by the nipple and, to this end, the nipple beyond the threaded portion 32 is provided with a tapered end portion 37 of such length that, when the parts are completely assembled, it extends substantially to the outer end of the threads 36 in the socket member but still lies spaced from the outer end of the socket member, as shown in Fig. 1. Thus, there is a small portion of the hose lying between the end of the tapered portion 37 and the extreme end of the socket member, adjacent the portion 35 of the latter, which is neither expanded nor clamped. This arrangement prevents the hose from being bent sharply at the end of the socket member and prevents any cutting action on the hose by the socket member at that point, resulting from bending of the hose. The extreme inner end of the hose is compressed between the tapered portion 37 where the latter meets the threaded portion 32 of the nipple and the portion 34 of the socket.

The difficulty heretofore experienced with fittings of this general character is that, when the extreme end of the tapered portion 37 approaches a position opposite the threads 36, the compressive action on the hose between the tapered end and the threads 36 tends to force the hose endwise of the socket, thus tending to move the end surface of the hose away from the shoulder 33 of the socket. This tendency to force the hose out of the socket is accentuated because of the fact that, in most fittings, by the time the end of the tapered portion of the nipple has reached the position mentioned, the threads 32 on the nipple have engaged the threads 31 in the flange 30 of the socket member. Engagement of these threads thus holds the socket member and nipple in predetermined relation to each other since the nipple moves relative to the socket at a rate determined by the pitch of the threads connecting the two parts. This tendency to force the hose part way out of the socket occurs in spite of the fact that the threads 32 are right-hand threads and the threads 36 are left-hand threads, and any rotation of the hose with the nipple as it is being inserted into the hose would, because of the left-hand threads 36, normally tend to force the hose farther into the socket. However, it will be noted from Fig. 5 that, at the time that the threads 32 first engage the threads 31, the hose has not been forced into complete engagement with the threads 36. Consequently at that time, the threads 36 do not exert sufficient holding force on the hose to prevent the hose from being forced partially out of the socket.

The present invention provides a construction which avoids this difficulty by having the tapered portion 37 of the nipple of sufficient length so that the extreme inner end of the hose is almost fully expanded into tight engagement in the portion 34 of the socket member before the threads 32 on the nipple engage the threads 31 in the socket. Thus, on inserting the nipple into the hose up to that point, the socket is not held in any predetermined position relative to the nipple by the inner-engagement of the threads 32 with the threads 31. For this part of the assembly, the endwise forces that are exerted to effect insertion of the tapered portion 37 thus far into the hose 20 are only applied to the nipple and the hose, and the socket merely remains or floats on the exterior of the hose without any force being exerted thereon or relative thereto that would tend to force the hose out of the socket. The extreme end portion of the hose being expanded into tight engagement with the portion 34 of the socket by the insertion of the nipple thus far, such end portion of the hose can be held against endwise movement relative to the socket.

To this end, I provide additional internal holding means in the socket in the form of an inwardly projecting annular rib 40 located in the portion 34. Thus, since the extreme end portion of the hose is expanded outwardly to fill the cavity defined by the portion 34 of the socket member by the insertion of the tapered portion of the nipple into the hose up to the point where the threads 32 first engage the threads 31, the internal holding means comprising the annular rib 40 has a firm grip on the end of the hose and prevents the hose from being forced endwise of the socket member by the further insertion of the nipple. It is of course important that the length of the tapered portion 37 of the nipple be sufficient so that the expansion of the extreme end portion of the hose into tight engagement with the rib 40 take place before the threads 32 engage the threads 31. As the nipple is inserted farther and the threads 32 are in engagement with the threads 31, the socket member has a predetermined relationship with the nipple with the latter moving farther into the socket as the nipple is rotated. At that time, in addition to the holding action of the rib 40, the portion of the hose opposite the threads 36 is being expanded into tight engagement with these threads so that as the nipple approaches its final position in the socket member and the hose, the latter is tightly held without any chance of endwise movement relative to the socket. Thus, with the present construction, there is no danger of the hose being moved endwise of the socket. The end surface of the hose consequently remains in tight engagement with the shoulder 33 and the maximum amount of sealing between the nipple, hose and socket member is achieved.

In the embodiment of the invention shown in Figs. 8 to 12, the hose, indicated at 41, is of a thicker wall type. The socket member, shown at 42, is somewhat elongated, compared to the socket shown in the former construction, and has a thicker end flange 43. The cavity within the socket member has end portions 44 and 45 which are of slightly larger diameter than the normal diameter of the hose 41, and between the end portions 44 and 45 is a threaded portion 46 in which the threads taper from a minimum height at both ends to a maximum height between the ends. The flange 43 has a central aperture which is threaded as at 47 to engage threads 50 on a nipple 51. The nipple 51 also includes a tapered end portion 52 which is adapted to extend into the hose along with a portion of the threads 52, as is evident in Fig. 12.

With the type of hose disclosed in these figures, the normal internal diameter of the hose is slightly less than the external diameter of the extreme end of the tapered portion 52 of the nipple. To facilitate insertion of the nipple into the hose, a mandrel 53 may be used. The mandrel is of such diameter that it may be easily slid through the nipple and is provided with a rounded and tapered end 54 which can easily enter the ends of the hose when first inserted therein.

On assembling the fitting shown in these figures, the hose of course is first placed in the socket 42 until the end surface of the hose abuts the shoulder formed by the flange 43. The threads 46 can be used to assist in forcing the hose into this position by turning the socket member relative to the hose in the proper direction so that the threads 46 tend to move the hose inwardly of the socket. The mandrel 53 is then inserted into the nipple so that the end 54 of the mandrel projects beyond the end of the nipple, as shown in the drawings. The mandrel with the nipple thereon is then placed in the central aperture of the flange 43 of the socket and the rounded end of the mandrel is inerted into the hose. As the two are moved inwardly, as soon as the tapered portion 52 of the nipple engages the interior of the hose, the latter will be expanded thereby since the diameter of the nipple is larger than the interior of the hose. The tapered portion gradually increases the expansion of the hose the farther it is inserted and, by the time the threads 50 on the nipple first engage the threads 47 on the socket as shown in Fig. 11, the extreme end portion of the hose has been expanded sufficiently to subsantially fill the inner portion 44 of the cavity in the socket. The end 54 of the mandrel has by this time reached the portion of the hose adjacent the threads 46 and, because the hose is compressed at that point by the threads, the mandrel has begun to expand the hose into tight engagement with the threads. The holding power of the threads 46 at that time, however, is not entirely sufficient to prevent endwise movement of the hose relative to the socket, and an annular rib 55 is formed in the portion 44 of the socket to firmly grip the hose and prevent endwise movement. Up to that point in the assembly, the threads 50 on the nipple have not yet engaged the threads 47 on the socket so that the two are not held in predetermined relation to each other. Thus, the endwise forces exerted in assembling the parts to that extent are applied only to the nipple and the hose. As the nipple is inserted farther into the hose and the threads of the nipple and socket are in engagement with each other so that a predetermined relationship exists between them, the hose is held by the annular rib 55 and cannot be forced out of the socket by the further insertion of the nipple. It will also be noted from Fig. 11, that the extreme end of the tapered portion 52 of the nipple is approaching a position opposite the end of the threads 46 at that time, so that from there on the hose is being expanded into tight engagement with the threads 46 to hold it firmly in place. After the nipple is fully inserted to the position shown in Fig. 12, the mandrel 53 may then be withdrawn.

While in the first form of the device illustrated in Figs. 1 to 7, I have shown only the one annular rib 40 and in the second form shown in Figs. 8 to 12 only the single annular rib 55, it is of course contemplated that more than one such rib may be used if desired. In some of the larger sizes of hose, it may be desirable to place either two or three such ribs in longitudinally spaced relation to each other. The form of the ribs 40 and 55 is preferably similar to a buttress type thread, that is, a rib which has a sharper angle on the face toward the flange of the socket member than the angle of the opposite face of the rib. Such form of rib of course bites into the hose and offers substantial resistance to the movement of the hose endwise relative to the socket member.

From the foregoing description, it will be apparent that I have provided a novel hose fitting which insures proper assembly of the fitting on the hose. Thus, the hose, as the nipple is inserted into it, is prevented from moving endwise relative to the socket member so that a tight sealing engagement is effected between the nipple and the socket. It will also be apparent that I have provided a novel method of assembling a fitting on a hose, which assures proper assembly.

I claim:

1. A hose fitting comprising a socket member and a nipple, said socket member having a hose receiving cavity open at one end of the member and having at the other end a radially inwardly extending internally threaded flange forming a shoulder adapted to abut against the end surface of the hose when the latter is inserted therein, blunt inwardly projecting circumferentially extending hose gripping means within the socket intermediate the ends thereof and of smaller internal diameter than the unstressed outside diameter of the hose to grip the exterior of the hose at an area spaced from the end of the hose, the cavity between said shoulder and said hose gripping means having a cylindrical enlarged portion extending to said shoulder to permit the end portion of the hose to expand therein when gripped between said hose gripping means and said nipple, said nipple having an end insertable through the shouldered end of the socket member into the hose and being tapered to its extremity to expand the hose and having an externally threaded portion adjoining said tapered end to engage the threaded flange of the socket member, at least one annular sharp edged rib formed intermediate the ends of said enlarged portion, spaced from said gripping means at least as far as its distance from said shoulder and adapted to grip the hose when the latter is expanded, said rib having an internal diameter greater than said hose gripping means and being located adjacent but spaced from said shoulder whereby the end portion of the hose is expanded into said enlarged portion between said shoulder and said rib and the hose is gripped by the rib when the nipple is initially inserted therein whereby the end surface of the hose is prevented from being forced away from said shoulder and further inserting movement of the nipple expands the hose into gripped engagement by said hose gripping means, said nipple being so proportioned that its tapered end expands the end of said hose into gripped engagement by said annular rib before the threads on said nipple engage the threads in said flange.

2. A hose fitting according to claim 1, in which said blunt inwardly projecting means are threads with their major diameter substantially uniform and their inner diameter tapering toward each end whereby said threads have their greatest depth intermediate the ends.

References Cited in the file of this patent

UNITED STATES PATENTS

| | | |
|---|---|---|
| 1,684,713 | Norgren | Sept. 18, 1928 |
| 2,266,211 | Kaiser | Dec. 16, 1941 |
| 2,288,684 | Couty | July 7, 1942 |
| 2,333,349 | Weatherhead | Nov. 2, 1943 |
| 2,371,971 | Main | Mar. 20, 1945 |
| 2,452,908 | Cowles | Nov. 2, 1948 |
| 2,476,480 | Burckle | July 19, 1949 |
| 2,485,976 | Main | Oct. 25, 1949 |
| 2,540,113 | Hartley | Feb. 6, 1951 |

FOREIGN PATENTS

| | | |
|---|---|---|
| 4,765 | Great Britain | Mar. 27, 1915 |
| 531,186 | Great Britain | Dec. 31, 1940 |
| 1,075,787 | France | Apr. 14, 1954 |